US011693900B2

(12) United States Patent
Klein et al.

(10) Patent No.: US 11,693,900 B2
(45) Date of Patent: Jul. 4, 2023

(54) METHOD AND SYSTEM FOR PROVIDING RESEGMENTED AUDIO CONTENT

(71) Applicant: SubPLY Solutions Ltd., Tel-Aviv (IL)

(72) Inventors: Gal Klein, Rishon-LeZion (IL); Rachel Ludmer, Kfar-Gibton (IL); Omri Koshorek, Petach-Tikva (IL)

(73) Assignee: SubPLY Solutions Ltd., Tel-Aviv (IL)

( * ) Notice: Subject to any disclaimer, the term of this patent is extended or adjusted under 35 U.S.C. 154(b) by 292 days.

(21) Appl. No.: 16/641,279

(22) PCT Filed: Nov. 20, 2017

(86) PCT No.: PCT/IL2017/051265
§ 371 (c)(1),
(2) Date: Feb. 24, 2020

(87) PCT Pub. No.: WO2019/038749
PCT Pub. Date: Feb. 28, 2019

(65) Prior Publication Data
US 2020/0183971 A1    Jun. 11, 2020

Related U.S. Application Data

(60) Provisional application No. 62/548,423, filed on Aug. 22, 2017.

(51) Int. Cl.
*G06F 16/00* (2019.01)
*G06F 16/638* (2019.01)
(Continued)

(52) U.S. Cl.
CPC ...... *G06F 16/638* (2019.01); *G06F 16/24578* (2019.01); *G06F 16/953* (2019.01); *G10L 15/26* (2013.01)

(58) Field of Classification Search
CPC ............ G06F 16/638; G06F 16/24578; G06F 16/953; G06F 16/61; G06F 16/683; G10L 15/26
See application file for complete search history.

(56) References Cited

U.S. PATENT DOCUMENTS 6,434,520 B1    8/2002   Kanevsky et al.
9,911,435 B1 *  3/2018   Sugar .................... G10L 15/187
(Continued)

FOREIGN PATENT DOCUMENTS

EP           2939234 B1 *  5/2020   ........... G06F 16/242
JP           2009-295101      12/2009
(Continued)

OTHER PUBLICATIONS

Fahmi Abdulhamid. SpEx: A Tool for Visualizing and Navigating Speech Audio. (Year: 2013).*

(Continued)

*Primary Examiner* — Syed H Hasan

(57) ABSTRACT

Methods and systems are disclosed for providing segments of audio broadcasts in responses to user queries. The segments are provided, for example, in real time, with the segments being precise segments responsive to the search query or other search request, located, isolated, and provided to the requesting party or entity. The queried audio segments are found by matching a medium, known as a "word cloud", obtained based on the query, with audio segments, obtained based on the query. The word cloud is continuously updated with time relevant terms, associated with the subject of the word cloud. The word cloud is applied to the audio segment to obtain the most relevant audio segments, which are resegmented from the audio segment.

31 Claims, 9 Drawing Sheets

(51) Int. Cl.
*G06F 16/953* (2019.01)
*G06F 16/2457* (2019.01)
*G10L 15/26* (2006.01)

(56) References Cited

U.S. PATENT DOCUMENTS

| | | | |
|---|---|---|---|
| 2010/0049500 A1 | 2/2010 | Kobayashi et al. | |
| 2010/0229082 A1* | 9/2010 | Karmarkar | H04W 4/02 715/764 |
| 2011/0040562 A1* | 2/2011 | Doyle | H04L 63/30 704/235 |
| 2011/0043652 A1 | 2/2011 | King et al. | |
| 2011/0044447 A1* | 2/2011 | Morris | G06T 11/206 704/E15.001 |
| 2012/0131060 A1 | 5/2012 | Heidasch | |
| 2012/0179465 A1* | 7/2012 | Cox | G10L 15/26 704/235 |
| 2013/0332450 A1* | 12/2013 | Castelli | G06F 16/3344 707/E17.046 |
| 2014/0046967 A1 | 2/2014 | Nash-Walker et al. | |
| 2016/0217799 A1 | 7/2016 | Han et al. | |
| 2017/0186422 A1* | 6/2017 | Lev-Tov | G06F 16/638 |
| 2017/0269899 A1* | 9/2017 | Spiessbach | H04L 67/02 |
| 2018/0260480 A1* | 9/2018 | Jannink | G06F 16/60 |

FOREIGN PATENT DOCUMENTS

| | | |
|---|---|---|
| JP | 2010-055259 | 3/2010 |
| WO | WO 2019/03874 | 2/2019 |
| WO | WO 2019/038749 | 2/2019 |

OTHER PUBLICATIONS

Spina et al. Extracting Audio Summaries to Support Effective Spoken Document Search. (Year: 2017).*
Notice of Reason(s) for Rejection dated Aug. 2, 2021 From the Japan Patent Office Re. Application No. 2020-502062 and Its Translation Into English. (13 Pages).
International Search Report and the Written Opinion dated Mar. 5, 2018 From the International Searching Authority Re. Application No. PCT/IL2017/051265. (9 Pages).
International Preliminary Report on Patentability dated Feb. 25, 2020 From the International Bureau of WIPO Re. Application No. PCT/IL2017/051265. (6 Pages).
International Search Report and the Written Opinion dated Dec. 6, 2017 From the International Searching Authority Re. Application No. PCT/IL2017/051265. (9 Pages).
Official Action dated Nov. 17, 2020 from the US Patent and Trademark Office Re. U.S. Appl. No. 15/508,120. (41 pages).
Notice of Reasons for Rejection dated Feb. 28, 2022 From the Japan Patent Office Re. Application No. 2020-502962 together with a machine transation into English. (2 Pages).

* cited by examiner

500

[Time = 0:00] -

- [Time = 2:24]

[Time = 0:00] Looking at the NBA it's playoff time again and the Cleveland Cavaliers face the Indiana Pacers as the Cavs seek another championship Jebrani Jones opened the series scoring forty points last night against the Pacers as part of the Cavaliers eighteen point comeback in the fourth quarter After taking the usual questions Jones diverted stating that President Trump's travel ban is unfair and that Hillary Clinton would have served the people better Hillary Clinton really knew that Ohio's people wanted good jobs Finally Jebrani got back to basketball as he said its not about scoring or an MVP award its getting the Cavs another ring so Cleveland can celebrate again [Time = 2:24]

FIG. 5A

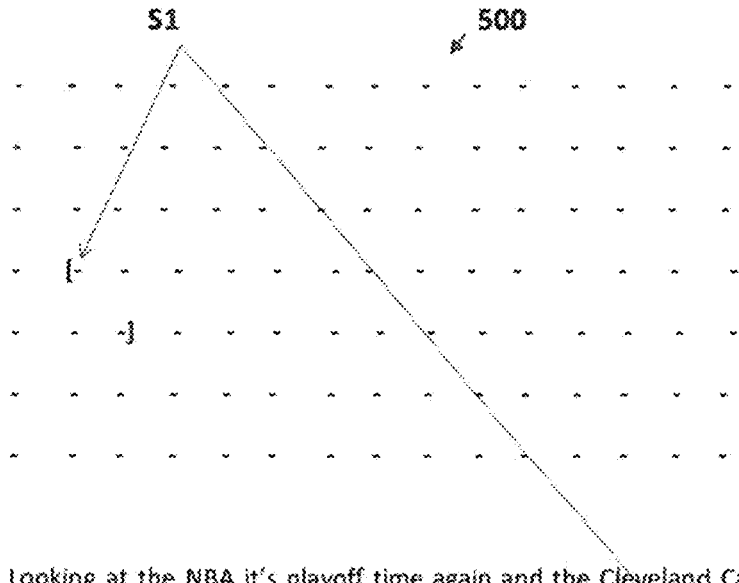

Looking at the NBA it's playoff time again and the Cleveland Cavaliers face the Indiana Pacers as the Cavs seek another championship Jebrani Jones opened the series scoring forty points last night against the Pacers as part of the Cavaliers eighteen point comeback in the fourth quarter [Time = 1:05] After taking the usual questions Jones diverted stating that President Trump's travel ban is unfair and that Hillary Clinton would have served the people better Hillary Clinton really knew that Ohio's people wanted good jobs Finally Jebrani got back to basketball as he said its not about scoring or an MVP award its getting the Cavs another ring so Cleveland can celebrate again

FIG. 5B-1

METHOD AND SYSTEM FOR PROVIDING RESEGMENTED AUDIO CONTENT

CROSS-REFERENCES TO RELATED APPLICATIONS

This application is related to and claims priority from commonly owned U.S. Provisional Patent Application Ser. No. 62/548,423, entitled Method and System for Providing Resegmented Audio Content, filed on Aug. 22, 2017, the disclosure of which is incorporated by reference in its entirety herein.

TECHNICAL FIELD

The present invention relates to methods and systems for providing audio content in accordance with requests therefor.

BACKGROUND

Audio broadcasts are commonplace, from both regular AM and FM band Radio, as well as satellite Radio, such as SiriusXM® Satellite Radio, and radio stations which use the Internet for broadcasting. While some content is recorded and archived, it is typically not accessible to the public, and if it is, it is not easily found.

SUMMARY OF THE DISCLOSED SUBJECT MATTER

The present invention includes embodiments that are directed to methods and systems which allow audio broadcasts to be searched, for example, in real time, with precise segments from the audio broadcast, responsive to a search query or other search request. The segments of the audio broadcast, or audio segment, are located, isolated, and provided to the requesting party or entity, for example, in real time. The queried audio segments are found by matching a medium, known as a "word cloud", obtained based on the query, with audio segments, obtained based on the query. The word cloud is continuously updated with time relevant terms, associated with the subject of the word cloud. The word cloud is applied to the audio segment to obtain the most relevant audio segments, which are resegmented from the audio segment.

Embodiments of the invention are directed to a method for providing audio content. The method comprises: receiving a query over a network from a requestor; obtaining a word cloud based on the query, the word cloud including a plurality of terms associated with a subject; obtaining an audio segment responsive to the query; and, applying the plurality of terms of the word cloud to the audio segment to obtain a portion of the audio segment responsive to the query, the portion of the audio segment obtained defining at least one subsegment.

Optionally, the method additionally comprises: providing the at least one subsegment in an audio form to the requestor.

Optionally, the word cloud is created from content obtained from content sources.

Optionally, the word cloud is continuously updated, such that one or more existing terms are replaced with one or more new terms.

Optionally, the audio segment is obtained by a computerized search engine.

Optionally, the audio segment is provided in text form.

Optionally, the at least one subsegment is of a length different than the length of the audio segment.

Optionally, the at least one subsegment is the same length as the audio segment.

Optionally, the at least one subsegment includes a plurality of subsegments arranged in a ranking based on relevancy to the query.

Optionally, the ranking is based on scores assigned to each subsegment of the plurality of subsegments.

Optionally, the applying the terms of the word cloud to the audio segment includes establishing boundaries within the audio segment for the portion of the audio segment responsive to the query.

Optionally, the terms of the word cloud include one or more of: words, phrases, partial words or word segments, groups of words, phrases, partial words and combinations thereof.

Embodiments of the invention are directed to a system for providing audio content. The system comprises: a query receiving module for receiving a query; a search engine for obtaining an audio segment responsive to the query; and, a processor for executing program code. The program code comprises: receiving the query from the query receiving module; obtaining a word cloud based on the query, the word cloud including a plurality of terms associated with a subject; and, applying the terms of the word cloud to the audio segment to obtain a portion of the audio segment responsive to the query, the portion of the audio segment obtained defining at least one subsegment.

Optionally, the search engine includes at least one computerized search engine.

Optionally, the processor for executing program code additionally comprises: providing the at least one subsegment in an audio form to the requestor.

Optionally, the processor for executing program code additionally comprises: creating the word cloud from content obtained from content sources.

Optionally, the processor for executing program code additionally comprises: continuously updating the word cloud, such that one or more existing terms are replaced with one or more new terms.

Optionally, the processor for executing program code additionally comprises: acquiring the audio segment in text form.

Optionally, the processor for executing program code additionally comprises: providing the at least one subsegment as at least two subsegments and arranging the subsegments in accordance with a ranked order.

Optionally, the ranked order of the subsegments is based on scores assigned to each subsegment.

Optionally, the applying the terms of the word cloud to the audio segment includes establishing boundaries within the audio segment for the portion of the audio segment responsive to the query.

Optionally, the terms of the word cloud include one or more of: words, phrases, partial words or word segments, groups of words, phrases, partial words and combinations thereof.

Embodiments of the invention are directed to a computer program product. The computer program product comprises a computer readable non-transitory storage device having stored therein computer readable instructions for providing audio content, when executed by a computer, causing the computer to perform operations. The operations comprise: receiving a query over a network from a requestor; obtaining a word cloud based on the query, the word cloud including a plurality of terms associated with a subject; obtaining an audio segment responsive to the query; and, applying the terms of the word cloud to the audio segment to obtain a portion of the audio segment responsive to the query, the portion of the audio segment obtained defining at least one subsegment.

Optionally, the computer program product additionally comprises causing performing of the operation of providing the at least one subsegment in an audio form to the requestor.

Optionally, the word cloud is created from content obtained from content sources.

Optionally, the word cloud is continuously updated, such that one or more existing terms are replaced with one or more new terms.

Optionally, the audio segment is obtained by a computerized search engine.

Optionally, the audio segment is provided in text form.

Optionally, the at least one subsegment is of a length different than the length of the audio segment.

Optionally, the at least one subsegment is the same length as the audio segment.

Optionally, the at least one subsegment includes a plurality of subsegments arranged in a ranking based on relevancy to the query.

Optionally, the ranking is based on scores assigned to each subsegment of the plurality of subsegments.

Optionally, the applying the terms of the word cloud to the audio segment includes establishing boundaries within the audio segment for the portion of the audio segment responsive to the query.

Optionally, the terms of the word cloud include one or more of: words, phrases, partial words or word segments, groups of words, phrases, partial words and combinations thereof.

This document references terms that are used consistently or interchangeably herein. These terms, including variations thereof, are as follows.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A uniform resource locator (URL) is the unique address for a file, such as a web site or a web page, that is accessible over Networks including the Internet.

"n" and "n$^{th}$" in the description below and the drawing figures represents the last member of a series or sequence of members, such as elements, servers, databases, caches, components, listings, links, data files, etc.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 5A is a diagram showing an audio segment and its representation; and,

FIGS. 5B-1 and 5B-2 are samples of segmenting/resegmenting larger audio segments, in accordance with the invention.

DETAILED DESCRIPTION OF THE DRAWINGS

Figure 1:
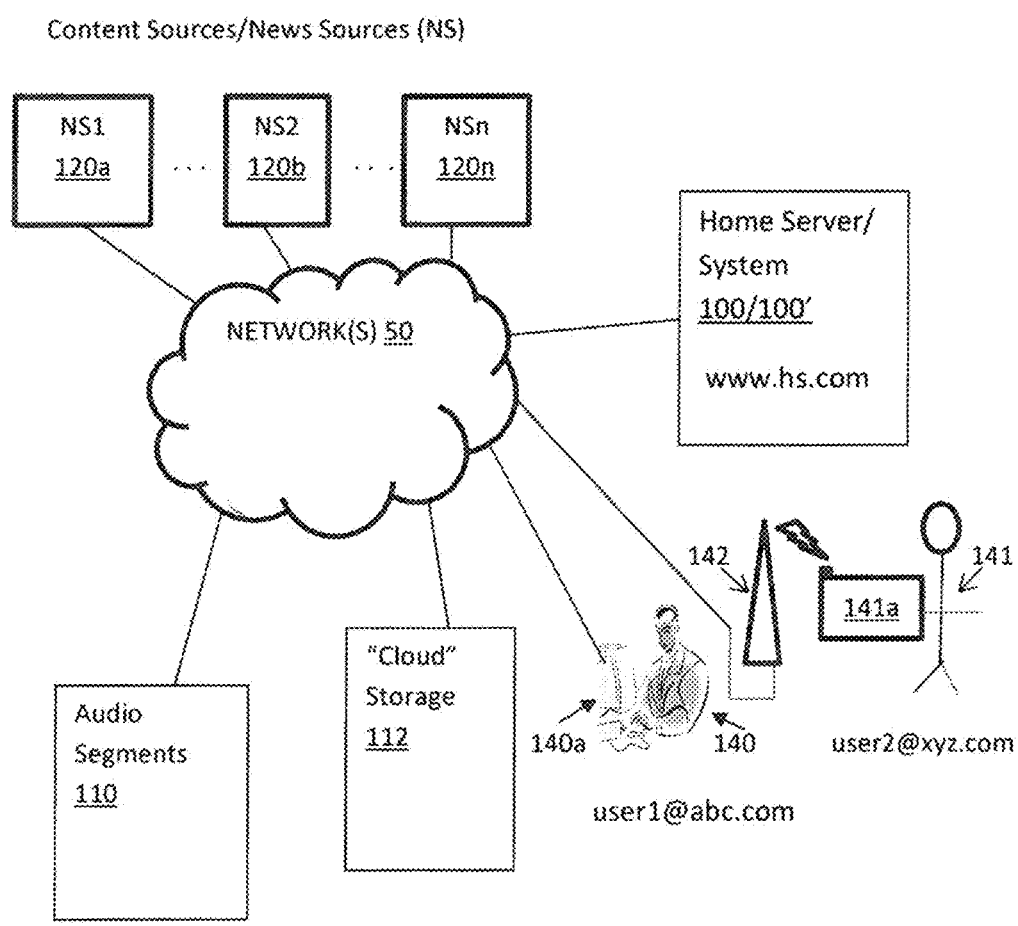
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

Embodiments of the present invention are directed to methods and systems for generating segments (e.g., subsegments or portions) of audio (audio segments), the audio segments typically larger than the generated segments, as responses to queries, received over networks and the like by the system of the invention. The audio segments are from various sources, such as broadcasts from radio, television and Internet broadcasts, including podcasts, webcasts and the like, recorded media and the like.

Reference is now made to FIG. 1, which shows an exemplary operating environment, including a network 50, to which is linked a home server (HS) 100, also known as a main server. The home server 100 also defines a system 100', either alone or with other, computers, including servers, components, and applications, e.g., client applications, associated with either the home server 100, as detailed below. The network 50 is, for example, a communications network, such as a Local Area Network (LAN), or a Wide Area Network (WAN), including public networks such as the Internet. As shown in FIG. 1, the network 50 is, for example, the Internet. The network 50, although shown as a single network, may be a combination of networks and/or multiple networks including, for example, cellular networks. "Linked" as used herein includes both wired or wireless links, either direct or indirect, and placing the computers, including, servers, components and the like, in electronic and/or data communications with each other.

The home server 100 and its system 100' perform the various processes in accordance with the present invention. Such processes include creating media known as "word clouds", which are, for example, associated with subjects or keywords, described below, and query and Rich Site Summary (RSS, a type of web feed allows users to access updates to online content in a standardized, computer-readable format) request processing to provide one or more audio subsegments, by resegmenting (or segmenting) audio segments, based on the word cloud corresponding with the words of the query, RSS request or other request input into the system 100' (query processing module 221 of FIG. 2). As used herein, the terms "resegmenting" and its derivatives, and "segmenting" and its derivatives, are used interchangeably herein, except where specifically indicated.

The aforementioned audio segments are, for example, segments or portions of audio broadcasts, which have been recorded and stored on various storage media, in forms such as digital files, from radio, television, recorded media, Internet, e.g., podcasts, and which are tagged and/or associated with ASR (automatic speech recognition) data, which is speech to text data including the timing of each word of the audio segment within the audio segment itself. For example, the audio segment itself begins at time 0.00 (zero minutes and zero seconds) and ends at 1:32 (one minute and thirty-two seconds). At 0:58 (zero minutes and fifty-eight seconds) into the audio segment, the words "Cleveland Cavilers" were presented, so that the timing of the audio for the words "Cleveland Cavilers" is 0:58 seconds into the audio segment of 1:32 in length. This timing is the same on the ASR transcript.

The audio segments, with tags and/or ASR data and stored in various storage media, are accessible via search engines and other computerized searching tools, for example, over network(s) 50, such as the Internet. The audio segments are provided to, and otherwise obtained by, the system 100', for example, having been created in accordance with the processes disclosed in commonly owned Patent Cooperation Treaty Application No. PCT/IL2017/050104, entitled: Method and System for Providing Audio Content, filed on Jan. 29, 2017, the disclosure of which is incorporated by reference in its entirety herein. The audio segments are also obtained from various external providers of audio ("audio" used interchangeably with "audio content" herein), such as directly from broadcasters, radio and television, as well as Internet podcasts, recorded media, and the like. The audio segments are stored, for example, in a dedicated server or server system, represented by the server 110 (for example, with corresponding metadata for the audio segments stored in the database 224a of the system 100'), linked to the network 50, cloud storage 112 (for example, with corresponding metadata for the audio segments stored in the database 224a of the system 100'), linked to the network(s) 50, or in a database 224b of the system 100', and are indexed either by a search engine which is a part of this system, or by an external search engine. Upon having search results, the digital audio files and the corresponding speech to text information, which also includes the text timing information within the segment, is accessed and obtained.

The home server (HS) 100 is of an architecture that includes one or more components, engines, modules and the like, for providing numerous additional server functions and operations. The home server (HS) 100 may be associated with additional storage, memory, caches and databases, both internal and external thereto. For explanation purposes, the home server (HS) 100 may have a uniform resource locator (URL) of, for example, www.hs.com. While a single home server (HS) 100 is shown, the home server (HS) 100 may be formed of multiple servers and/or components.

Servers (NS1 to NSn) 120a to-120n are associated with content sources, for example, news sources, from where data is obtained for creating the word clouds. These servers 120a to 120n are linked to the network(s) 50. News Sources (NS) include, for example, CNN (www.cnn.com), BBC (www.bbc.com), ESPN (www.espn.com), Fox News (www.foxnews.com), and the like.

While the servers 100, 110, 112, 120a-120n which are shown in FIG. 1 and described herein, are those most germane to the disclosure of the invention herein, other servers computers and the like linked to the network 50, either directly or indirectly, are also permitted.

Users who seek the content, via queries, RSS requests and other requests input into the system 100', with the content provided by the system 100' of the invention, are represented by exemplary users 140, 141. User1 140, user1@abc.com, links to the network 50 via his computer 140a, either by wired links, WiFi®, or combinations thereof. User2 141, user2@xyz.com and telephone number+1 913 222 8787, links to the network 50 via a mobile computing device, such as a smartphone 141*a* (via cellular tower 142). The user computer 140*a* can be a standard desktop computer, workstation or the like, laptop, tablet (e.g., iPad® from Apple). Both the user computer 140*a* and the smart phone 141*a*, for example, run web browsing applications (for accessing web sites and web pages and URLs), such as Chrome®, Internet Explorer®, FireFox®, Edge®, or a voice operated device such as Amazon® Echo™.

Figure 2:
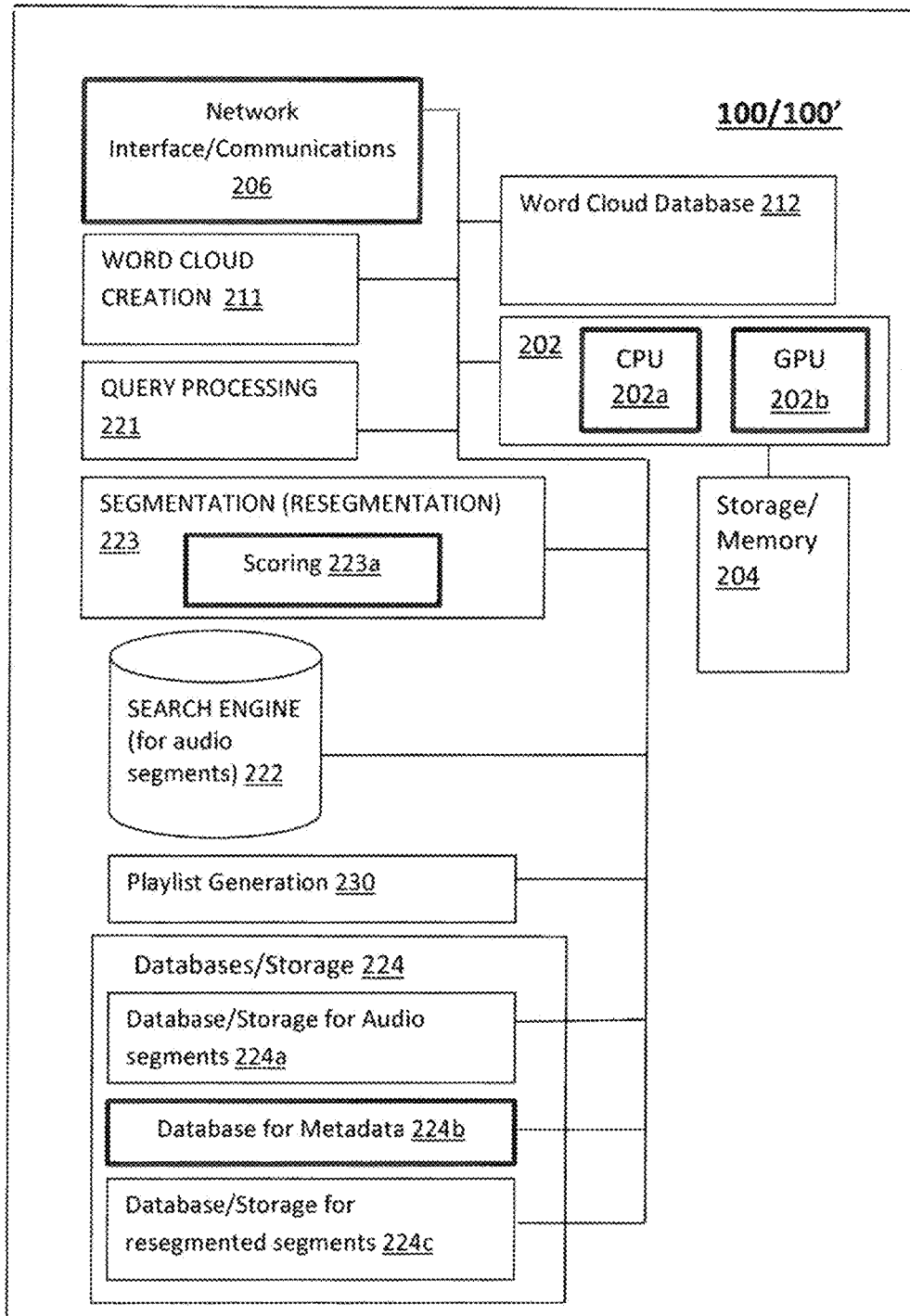
FIG. 2 is a diagram of the architecture of the home server of FIG. 1 and the system thereof.

Attention is now directed to FIG. 2, which shows the architecture of the system 100', for example, in the home server 100. This architecture of the system 100', as shown, for example, in the home server 100, includes a computerized processing unit 202, formed of a central processing unit (CPU) 202*a* and/or a graphical processing unit (GPU) 202*b*, each formed of one or more processors. The computerized processing unit 202, is such that the CPU 202*a* and/or GPU 202*b* are, for example, electronically connected, including in electronic and/or data communication with each other, as well as with the storage/memory 204, a network interface/communications module 206, a word cloud creation module 211, a word cloud database 212, a query processing module 221, a search engine 222, for example, for audio segments, a segmentation/resegmentation module 223, databases/storage 224, and a playlist generation module 230. While components 204, 206, 211, 212, 221, 222, 223, 224 and 230, are shown within the home server 100, any one or more of these components may be external to the home server 100, and be linked to the home server 100 from their external location.

The Central Processing Unit (CPU) 202*a* and/or the graphical processing unit (GPU) 202*b* is formed of one or more processors, including microprocessors, for performing the home server 100 functions and operations detailed herein, including controlling the components 204, 206, 211, 212, 221, 222, 223, 224 and 230.

The Central Processing Unit (CPU) 202*a* processors are, for example, conventional processors, such as those used in servers, computers, and other computerized devices, including data processors, for performing the home server 100 and system 100' functions and operations detailed herein. These system 100' functions and operations, for example, include controlling the network interface/communications module 206, the word cloud creation module 211, the word cloud database 212, the query processing module 221, the search engine 222, the segmentation module 223, databases/storage 224, and the playlist generation module 230, along with the processes and subprocesses shown in FIGS. 3A and 4, as detailed below. For example, the processors may include x86 Processors from AMD and Intel, Xenon® and Pentium® processors from Intel, as well as any combinations thereof.

The graphics processing unit (GPU) 202*b*, allows for parallel computing with the CPU 202*a*, such that the computerized processing unit 202 is functional with either or both the CPU 202*a* and GPU 202*b* executing. An example GPU 202*b* includes GPU chips/chipsets from NVIDIA of Santa Clara, Calif.

The storage/memory 204 is associated with the CPU 202*a*, and/or the GPU 202*b* is any conventional storage media. The storage/memory 204 also includes machine executable instructions associated with the operation of the above listed components, along with the processes and subprocesses shown in FIGS. 3A and 4, detailed herein. The storage/memory 204 also, for example, stores rules and policies for the system 100' and the home server 100. The processors of the CPU 202*a* and GPU 202*b* and the storage/memory 204, although shown as a single component for representative purposes, may be multiple components, and may be outside of the home server 100 and/or the system 100', and linked to the network 50.

The network interface/communications module 206 handles communications over the network 50, both to and from the home server 100 and its system 100'.

The word cloud creation module 211 creates the media or word clouds used in segmentation/resegmentation. The word cloud module 211 creates the word clouds, and updates them, for example, in accordance with the process of FIG. 3A, detailed below. The word clouds are associated with subjects, keywords or the like, with "subject(s)" and "keyword(s)" used interchangeably herein. The word clouds are formed of terms associated with a keyword or subject. These "terms" include, for example, words, phrases, partial words or word segments, groups of words, acronyms, abbreviations, and combinations thereof. The word clouds are created in accordance with the aforementioned processes, and are stored, for example, in the word cloud database 212 and/or cloud storage 112, with metadata for the cloud stored word clouds in the database 212.

The query processing module 221 includes logic for processing the received queries and RSS feeds requesting audio segments. The logic includes, for example, text processing to isolate the content of the query, for example words of the query, where the words include, for example, words, phrases, partial words or word segments, groups of words, phrases, acronyms, abbreviations, partial words and combinations thereof. The query processing module 221 renders the queries into data, and accordingly, input, usable by the search engine 222. Optionally, this process may be performed differently for RSS feeds and queries made by users. For instance, a user query may be analyzed to find the intent of the user, for example, by using Microsoft Language Understanding Intelligent Service (LUIS, https://www.luis.ai/home). Using such systems and processes may allow to differentiate the question "what's new with Donald Trump", which refers to a recent time-frame, from the question "tell me something about Donald Trump", which has a longer time frame.

The search engine 222 analyzes the data from the query processing module 221 and searches for audio segments in the database 224*a*, the audio segments in dedicated server/storage 110 or in the cloud storage 112, or in combinations thereof. The search engine 222 is, for example, a computerized search engine, running, for example, Azure™ Search from Microsoft of Redmond Wash. USA. The search engine 222 may be, for example, a search engine of an external provider, as well as a database associated therewith, one or both of which resides outside of the home server 100, provided that the ASR data received from the external provider's search engine is usable by the system 100'.

The segmentation/resegmentation module 223 then segments (resegments), e.g., divides, the audio segment (for example, a single large segment of audio content) into one or more subsegments, the obtained audio segment, based typically on one, but may be multiple, selected word clouds, which the segmentation module 223 acquires from the word cloud data base 212, the cloud storage 110, or combinations thereof. The segmentation is based on the words in the word cloud and of the query itself, coupled with rules and policies, including repeated occurrences of keywords, ignoring of stop words, e.g., "a", "an", "the" and pronouns. For example, keywords and/or subjects (as well as words) must be within a certain (predetermined) time interval or a word interval (within a predetermined number of words, word portions and the like). The segmentation/resegmentation is performed, for example, in accordance with the process of FIG. 4. The segmentation/resegmentation module 223 includes a scoring module 223a that generates a numeric score depicting the relevance of the re-segmented audio portion to the query.

The segmentation module 223, separates the segments from the audio segment by locating start and end points or boundaries of the segment, or augments the segmentation process by applying parameters, such as scores (for words), time, other words/phrases associated with the terms of the word cloud, time intervals with respect to words, and word intervals, in order to select the subsegments most relevant to the query from the audio segment, as detailed above.

The databases/storage 224, include, for example, databases for storage of audio segments 224a, metadata 224b and resegmented segments 224c, which result from the aforementioned segmentation (resegmentation). Other databases are also permissible as needed.

An optional playlist generation module 230 sorts resegmented subsegments into an order, in accordance with various stored rules and policies. As a result, the requestor has a playlist of subsegments.

Figure 3A:
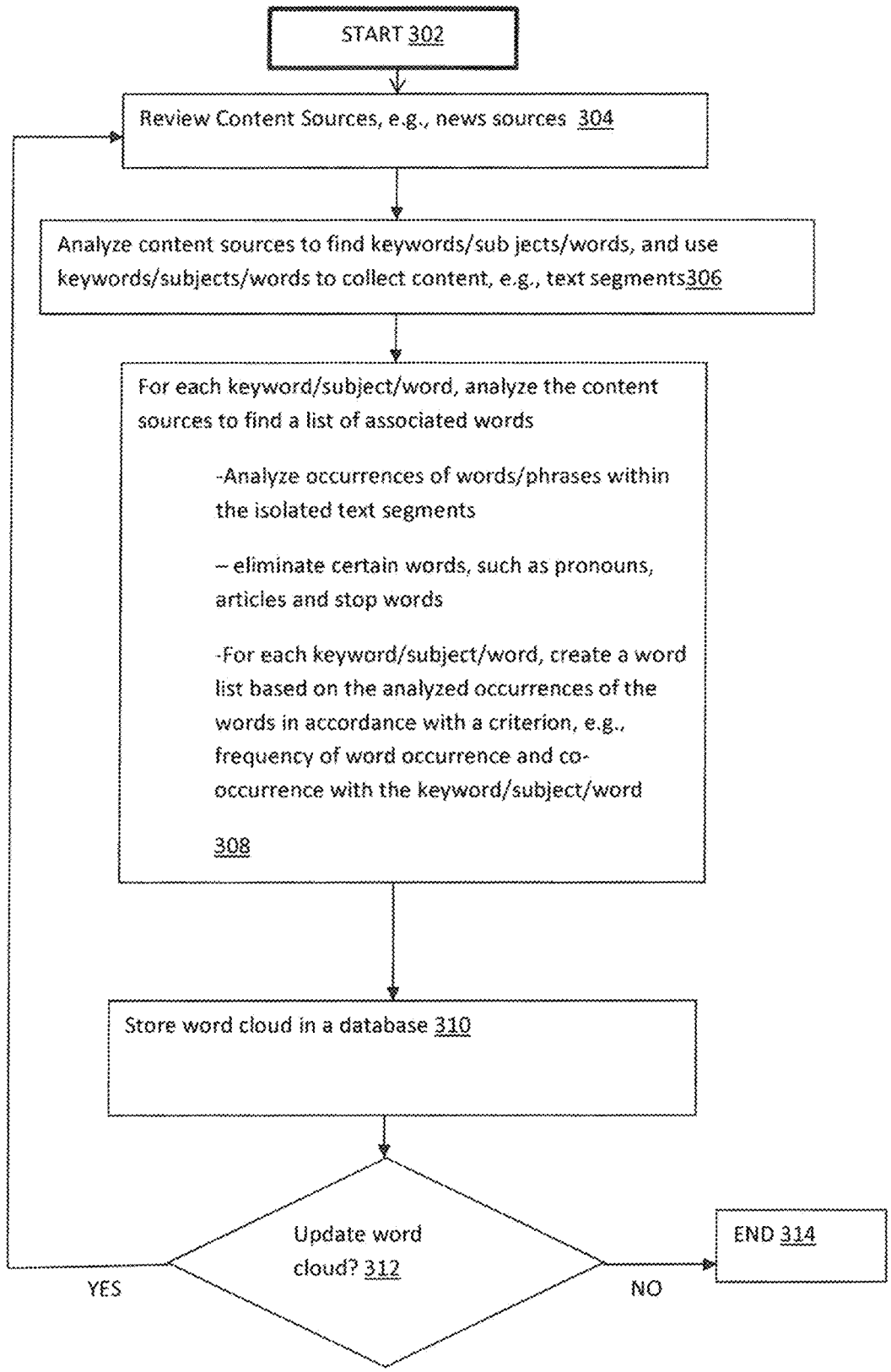
FIG. 3A is a flow diagram of an example process in accordance with embodiments of the present invention for generating a word cloud.

Attention is now directed to FIG. 3A which shows a flow diagram of a computer-implemented processes in accordance with embodiments of the disclosed subject matter, for example, for creating a medium known as a word cloud. A word cloud is configured to provide each identified keyword or subject, phrase, concept or the like (collectively "keywords, hereinafter), or a collection of keywords/subjects, with a collection of terms associated with it, according to dynamic external content sources, e.g., news sources (NS1-NSn) 120a-120n, and which does not necessitate the time-consuming analysis of very large corpuses of documents. The word cloud is dynamic, in that terms can be added or deleted from the word cloud over the lifetime of the word cloud, based on the evolving association of a term with the requisite keyword or subject. For a collection of keywords or subjects, the word cloud contains the set of rules determining how to construct the appropriate cloud for term combinations, for example, by intersecting the terms that each of the keywords or subjects are associated with.

Figure 3B:
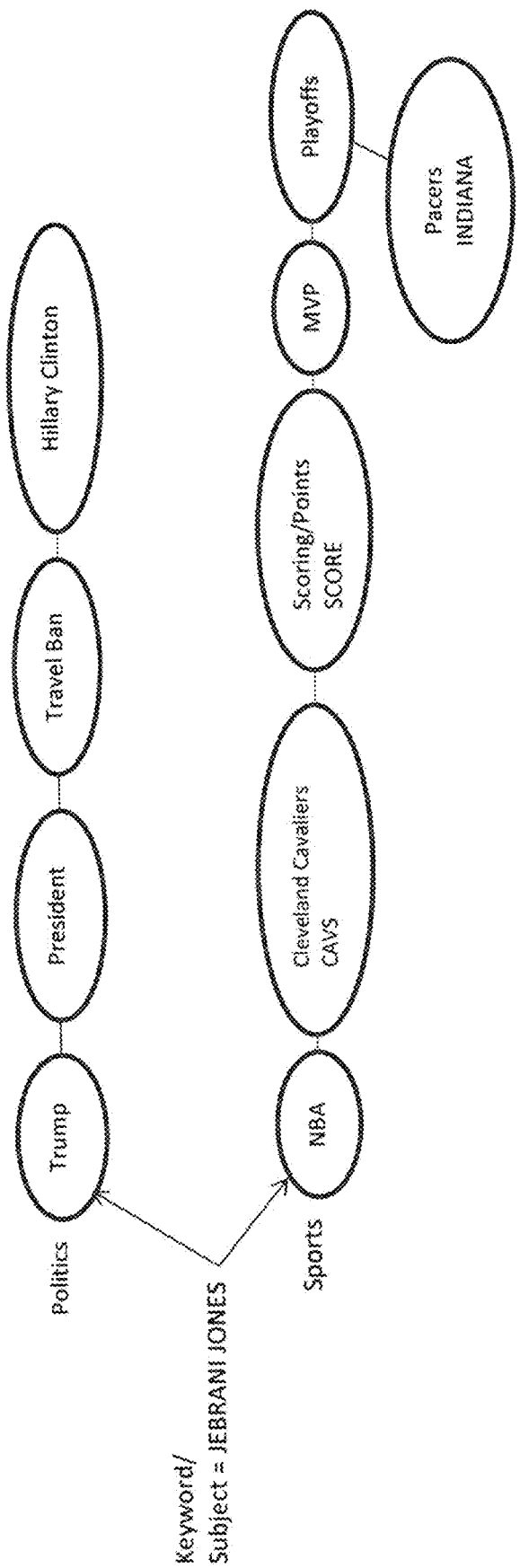
FIG. 3B is an example word cloud generated by the process of FIG. 3A.

An example word cloud, produced by the process of FIG. 3A is shown in FIG. 3B. This word cloud is for the keyword/subject "Jebrani Jones" and topics, "politics" and "sports". The topic "politics" includes the terms "Trump" and "president", while the topic "sports" includes the terms "NBA" "Cleveland Cavaliers/Cays". Reference is also made to elements shown in FIGS. 1 and 2. The process and subprocesses of FIG. 3A include computerized processes performed by the system 100'. The aforementioned processes and sub-processes can be, for example, performed manually, automatically, or a combination thereof, and, for example, in real time.

The process of FIG. 3A begins at the START block 302. The process moves to block 304, where various content sources, such as news sources, e.g., represented by News Source (NS) servers NS1 120a to NSn 120n, for example, in the form of digitized text, are monitored, for example, by the word cloud creation module 211 for various content, "terms" based on topics, subjects, keywords, and the like. The content sources, e.g., news sources, are analyzed using the keywords or subjects, at block 306, and digital data, for example, in the form of electronic text or electronic text segments, is collected based on the various keywords or subjects.

Moving to block 308, for each determined keyword or subject, the news sources are analyzed to find a list of associated terms, which will make up the word cloud. This process involves, for example, three sub processes.

The first subprocess operates by analyzing occurrences of various words and phrases of the terms within text segments, which were isolated based on the keywords.

The second subprocess involves analyzing the text segments to identify the terms which will serve as beneficial cloud terms. This may optionally include eliminating certain words such as pronouns, and stop words, which include, for example, "a", "an", conjunctions, frequently used words, and any other words programmed into the system 100' as stop words. Optionally, other than using stop words, processes such as named entity recognition (for example, by using the named entity recognition provided as part of the Stanford CoreNLP package available at https://stanfordnlp.github.io/CoreNLP/), and keyword detection may be used (for example, by using the POS Tagger provided as part of the Stanford CoreNLP package available at https://stanfordnlp.github.io/CoreNLP/ to extract nouns), with the stop words, or instead of the stop words. Optionally the words of the text may be lemmatized or stemmed in order to group variant forms of words or phrases. Optionally, word-embeddings, as described for example, in, Jeffrey Pennington, Richard Socher, and Christopher Manning, "Glove: Global vectors for word representation," in *Empirical Methods in Natural Language Processing (EMNLP)*" (2014), pages 1532-1543, may be used to identify words in the segmented/resegmented text, which are similar in meaning.

The third subprocess is such that for each keyword or subject, a list of terms is created based on the analyzed occurrences of the terms in accordance with their cloud score, which is computed using at least one criterion. The criterion includes, for example, frequency of the word occurrence within the text segments isolated according to a keyword/subject, that is the word co-occurrence with the keyword/subject. Optionally, methods such as TF-IDF (term frequency-inverse document frequency), may be employed in this criterion. For each keyword/subject, the list of terms co-occurring with it which obtained minimal scores, with each term(s) sorted by its score and linked, so as to form a word cloud, as illustrated, for example, in FIG. 3B. Optionally, this process may be performed separately for news items from different categories (to create several lists for keywords/subjects appearing, for example, both in the topics of "sports" and "politics". Optionally this process may be performed separately for clusters of similar news items, and again, creating several lists of cloud terms for the same keyword/subject, according to different news stories (i.e., Trump & Russia cluster, Trump & health care cluster, and the like).

Optionally, the rules and parameters of the aforementioned sub-processes may be augmented, upon having user feedback on the quality of the retrieved segments and employing machine learning processes such as optimization and classification.

The process moves to block 310, where the created word clouds are stored in a database, such as the word cloud database 212, or in cloud storage 112 or such, that may allow retrieval by keyword/subject, and/or topic.

Since the exact keywords/subjects or collection of keywords/subjects in the query may not appear during word cloud creation, the cloud retrieval flow enables retrieving a word cloud for keywords and collections of keywords that are similar but not identical to the keywords generated during the word cloud creation flow (FIG. 3A), or a combination thereof. This process may include, for example, keywords lemmatization (for example, "score" instead of "scoring"), the use of word-embeddings, as described for example, in, Jeffrey Pennington, Richard Socher, and Christopher Manning, "Glove: Global vectors for word representation," in "*Empirical Methods in Natural Language Processing (EMNLP)*" (2014), pages 1532-1543, or intersecting word clouds. Optionally, the rules and parameters of this process might be further improved upon having user feedback on the quality of the retrieved segments and employing machine learning processes such as optimization and classification. Optionally, the intent and context of the query, as analyzed by the query processing module 221, might be used in order to retrieve the relevant sub-part of the keyword's word cloud (for example if the intent of a query about Jebrani Jones is identified as "politics" then the politics topic sub-part of the word cloud in FIG. 3B will be retrieved).

As the news sources are continuously monitored, for example, the monitoring being periodic at regular intervals of time, the system 100' determines whether one or more of the word clouds need to be updated, at block 312. If a word cloud needs to be updated, due to trending and the like within the news sources, the process moves to block 304 and resumes as detailed above, for each word cloud that needs updating. If updating of the word cloud or word clouds is not needed at block 312, the process moves to block 314, where it ends.

Optionally, word clouds have a limited life time, and if they were not updated, expire after a few days, or other predetermined time period. Optionally, the history of word clouds may be kept (stored in storage media) and used to create different word clouds for different time frames. For example, for the term "Donald Trump" a word cloud for a time frame of 6 months will include the terms "president" & "white house", since these terms were frequent across word clouds for the last 6 months. The word cloud for the last day may include these aforementioned terms, but also the terms "Afghanistan" & "strategy", since these were mentioned in association with "Donald Trump", in the last day. The word cloud to be used in the segmentation/resegmentation will be determined according to the information provided by the query processing module 221.

Turning to FIG. 3B, a sample word cloud is shown for the keyword or subject "Jebrani Jones". Jebrani Jones is a star professional basketball player for the Cleveland Cavaliers of the National Basketball Association (NBA), who is also highly influential in society and politics. From the most recent news sources Jebrani Jones is in the news as he has made statements concerning politics, as well as being in the NBA playoffs. Based on the news items Jones has commented numerous about President Trump's travel ban and how it is unfair, as well as former presidential candidate, Hillary Clinton. In sports news, Jones is constantly mentioned in the news as an NBA star, who plays for the Cleveland Cavaliers, who are now in the playoffs. His being named playoff and league MVP is prevalent in many news sources, as his scoring and point totals from each game he plays in. While terms extracted from the news sources are shown in the upper line of a topic, similar words or other associated words are, for example, shown in all capital letters.

Figure 3C:
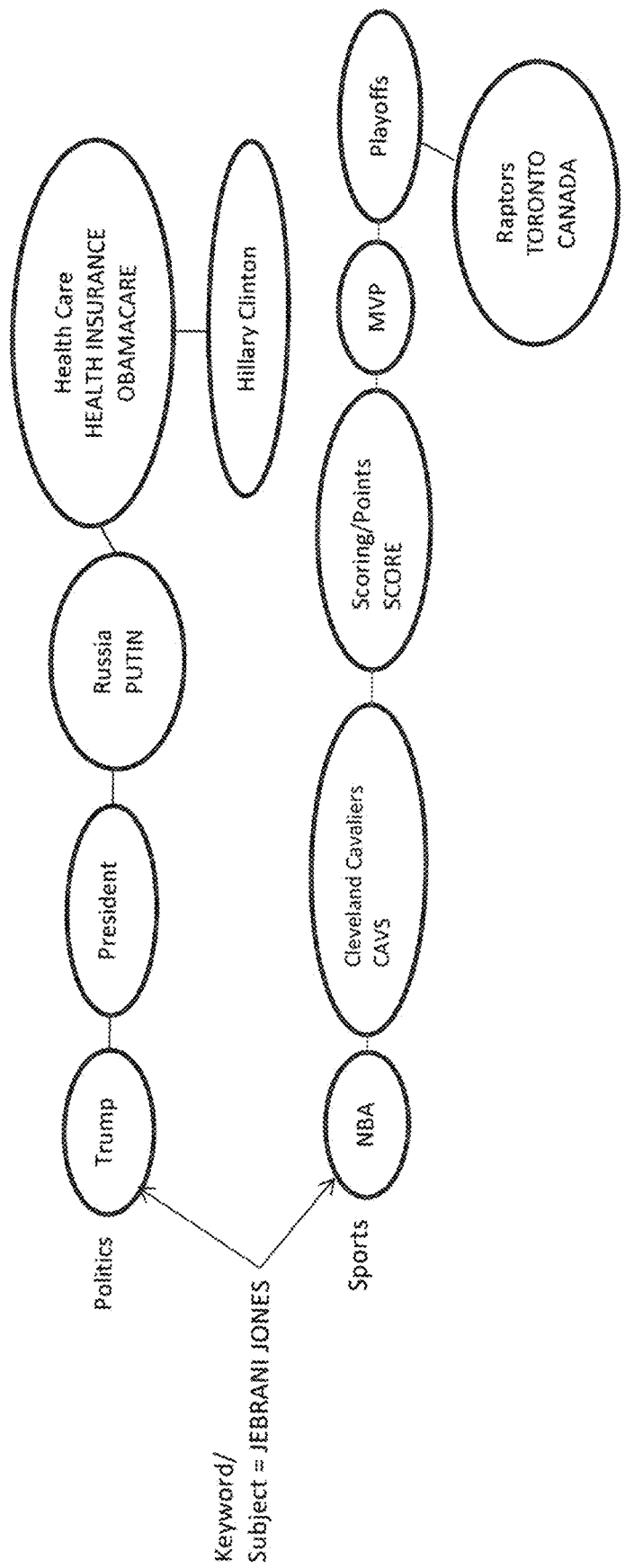
FIG. 3C is an example word cloud generated by the process of FIG. 3A one day after the example word cloud of FIG. 3B was generated.

For example, updating of a word cloud, such as that of FIG. 3B, to show changes which occurred in the past day for the keyword or subject "Jebrani Jones", are, for example, as follows. As shown in the updated word cloud of FIG. 3C, The Cleveland Cavaliers on the strength of Jebrani Jones's scoring have defeated the Indiana Pacers in the playoffs. Now they are facing the Toronto Raptors in the NBA Quarter Finals." In the word cloud, the term "Raptors" now replaces "Pacers" and the term "TORONTO" replaces "INDIANA", and "CANADA" is added, as the Raptors are from Toronto Canada. Also, in politics, there is now a story about President Trump being in contact with Russians before the election. Accordingly, the term "Russia" replaces "Travel Ban" in the word cloud, with the term "PUTIN" being added to "Russia", as Vladimir Putin, the Russian leader, denies the Russian contact before the election.

Figure 4:
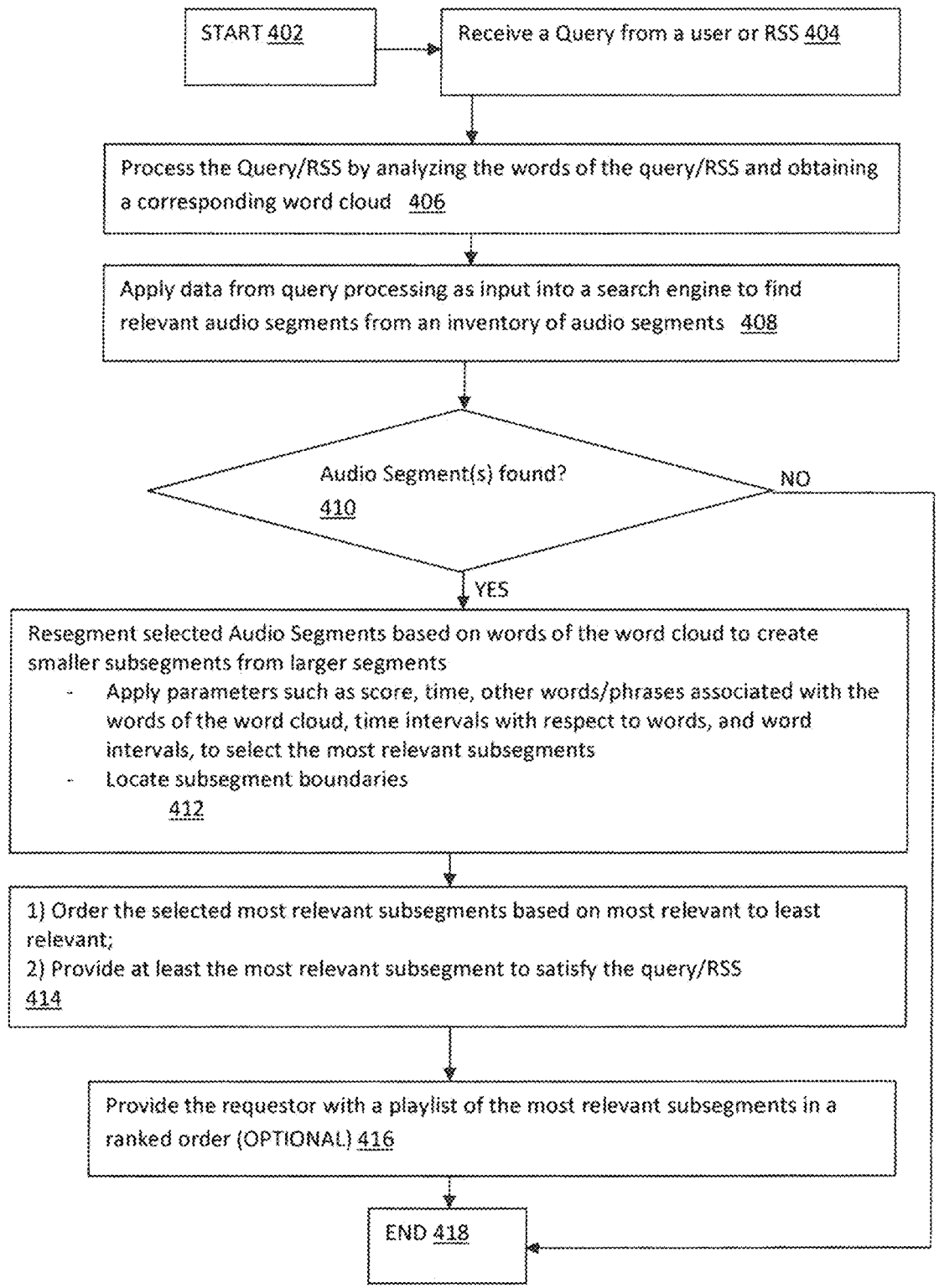
FIG. 4 is a flow diagram of an example process in accordance with embodiments of the present invention for generating resegmented audio segments/subsegments in response to a query or RSS (Rich Site Summary)

With the retrieved word cloud, the system 100' will now perform a process of segmentation/resegmentation of audio segments, obtained to satisfy a query, provided to the system by a user 140, 141, or an RSS. This process is shown in FIG. 4, to which attention is now directed. The process and subprocesses of FIG. 4 include computerized processes performed by the system 100'. The aforementioned processes and sub-processes can be, for example, performed manually, automatically, or a combination thereof, and, for example, in real time. Reference is also made to elements shown in FIGS. 1 and 2.

The process begins at a START block 402 The process moves to block 404, where a query is received from a user or an RSS is provided, both to the query processing module 221 of the system 100'. The process then moves to block 406, where the query/RSS is processed by analyzing the words of the query/RSS to obtain a word cloud. Next, at block 408, data from the query processing module 221 is input into the search engine 222, and the search engine 222 searches the inventory of audio segments, stored, for example, in the data base 224a, dedicated server 110 or cloud storage 112, to find relevant audio segments, and typically, a single audio segment, that matches or otherwise corresponds or satisfies the query.

The process moves to block 410 where it is determined whether the search engine 222 has found one or more audio segments, which satisfy the query. If no, the process moves to block 418, where it ends. If yes, the process moves to block 412, where the process continues.

At block 412, the selected audio segments are segmented (resegmented) into subsegments based on the query and its selected word cloud.

The boundaries of the re-segmented audio segment burst may be defined and otherwise located, from the first occurrence of any query or cloud keyword to the occurrence. Optionally, these boundaries may be defined at the boundaries of a region in the text where the density (i.e. the maximal distance between two keywords and their number) surpasses a certain threshold. This threshold may be predefined and/or based on an optimization process using a manually labeled set of examples. Optionally, these aforementioned computations may use scores assigned to query words and cloud keywords/subject scores, in addition to positions in the text. Optionally, word-embeddings, as described for example, in, Jeffrey Pennington, Richard Socher, and Christopher Manning, "Glove: Global vectors for word representation," in "*Empirical Methods in Natural Language Processing (EMNLP)*" (2014), pages 1532-1543, may be used to identify words in the segmented/resegmented text, which are similar in meaning to query words or word cloud terms. Also, for example, analysis of sentence structure (POS-tagging) and analysis of various audio cues (for example music, silences, speech prosody, speaker change) may be used to refine the locations of the start and end points, to increase the response accuracy. Optionally, the rules and parameters of this process may be augmented upon having user feedback on the quality of the retrieved segments and employing machine learning processes such as optimization and classification.

Figures 2, 5B:
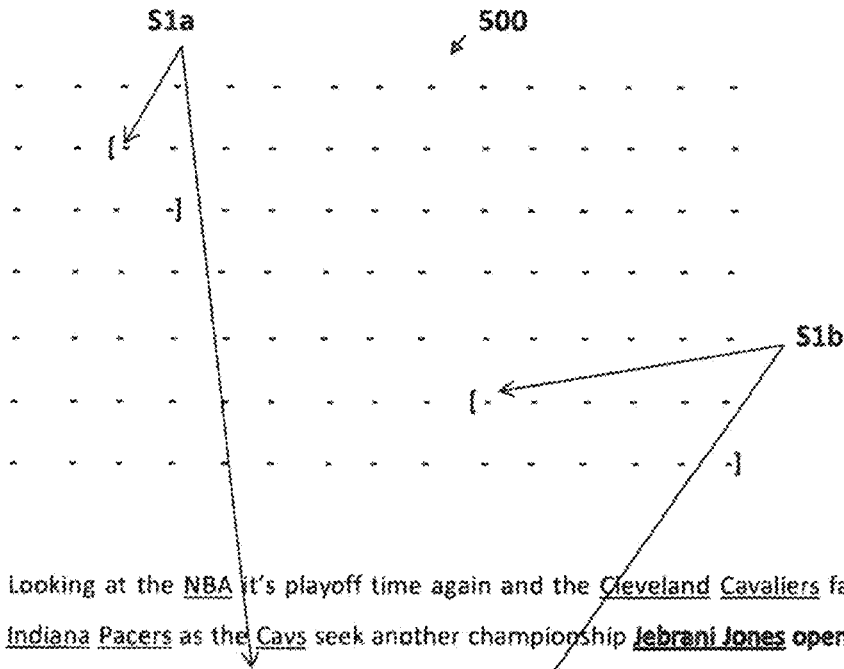

For example, a query based segmentation (resegmentation) is shown in FIGS. 5A, 5B-1, and 5B-2. This is based on an audio segment 500, as shown in FIG. 5A. The audio segment 500 runs between a start or origin time of 0:00 (zero minutes and zero seconds) and a finish time of 2:24 (two minutes and twenty-four seconds).

The audio segment 500 (with audio words of the segment represented by the series of dashes), for example, has been segmented into one subsegment S1, shown in FIG. 5B-1, in response to the query: "Has Jebrani Jones said anything about Trump?" Coupling the query, with the word cloud of FIG. 3B, there are matches for query words and word cloud (FIG. 3B) terms "Jones", "Trump", "president", "travel ban" and "Hillary Clinton." These terms along with other terms from the word cloud, e.g., of FIG. 3B, are underlined, as the word cloud of FIG. 3B, which is, for example, being applied in FIGS. 5A, 5B-1, and 5B-2.

The response to the query is the audio segment S1, located one minute and five seconds (Time=1:05) into the audio segment 500. At time 1:05, the subsegment S1 began. The user receives data and/or a file with the audio subsegment "S1" associated with the ASR text:

S1—After taking the usual questions Jones diverted stating that President Trump's travel ban is unfair and that Hillary Clinton would have served the people better Alternately, the query result may also add the segment, "Hillary Clinton really knew that Ohio's people wanted good jobs", where S1 would alternately be:

S1—After taking the usual questions Jones diverted stating that President Trump's travel ban is unfair and that Hillary Clinton would have served the people better Hillary Clinton really knew that Ohio's people wanted good jobs Should the query have been, "How many points did Jebrani score in last night's game?", and applying the word cloud of FIG. 3B, the requesting user receives data and/or a file with the audio subsegments S1a and S1b from FIG. 5B-2:

S1a—Jebrani Jones opened the series scoring forty points last night against the Pacers as part of the Cavaliers eighteen point comeback in the fourth quarter and, S1b—Finally Jebrani got back to basketball as he said it's not about scoring or an MVP award it's getting the Cays another ring so Cleveland can celebrate again Here, there are term matches for word cloud (FIG. 3B) terms (including keywords/subjects) "Jebrani", "scoring", "points" and "cavaliers". The audio segment 500 has been segmented into sub-segments S1a and S1b.

The segmentation or separation of the subsegments from the audio segment of block 412 is also performed or augmented by the segmentation module 223, which separates the segments from the audio segment by locating start and end points or boundaries of the of the subsegment. This segmentation or augmented segmentation is described for block 412 above.

While the subsegments are typically smaller than the audio segment, there may be cases where the entire audio segment is most relevant and therefore is not further segmented (by the segmentation module 223).

The process now moves to block 414 where the most relevant subsegments are ordered based, for example, on relevance to the query, most relevant to least. For example, for the query, "How many points did Jebrani Jones score in last night's game?", subsegments S1a and S1b were found (for block 412) with relevance score larger than zero (or any other defined threshold), and ordered with subsegment "S1a" first, followed by subsegment "S1b", based on relevance score.

Remaining in block 414, at least the most relevant subsegment, is provided to the user (requester) 140, 141, via their respective computer 140a, 141a. Accordingly, for the query, "How many points did Jebrani Jones score in last night's game?", at least subsegment S1a is returned to the user in response to the query.

Moving to block 416, the user associated with the query may receive a playlist of subsegments, created by the playlist module 430 in an optional process. Staying with the query, "How many points did Jebrani Jones score in last night's game?", the playlist can include subsegment S1a, S1b, and similar subsegments generated from other retrieved audio segments, which are different than the audio segment 500, including from different sources.

From block 414 or optionally, block 416, the process moves to block 418 where it ends.

Optionally, a query can be generated automatically from news items headlines.

Optionally, a playlist can be generated by concatenating answers for several manual, or automatically generated questions.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed, herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, microprocessors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for providing audio content comprising:
by at least one hardware processor:
generating and maintaining a plurality of dynamically changing word clouds stored in a database, wherein each of said plurality of word clouds is associated with a different subject, said generating and maintaining is conducted by an execution process which reduces processing time, by:
monitoring a plurality of content sources,
analyzing a content of said plurality of content sources and identifying a plurality of content subjects,
for each content subject of said plurality of content subjects, extracting a list of terms identified in said plurality of content sources and associated with the respective content subject, and
storing, in said database, said content subject and the list of terms identified as associated with said content subject, as a word cloud of the plurality of word clouds;
receiving a query over a network from a requestor;
analyzing a plurality of words included in said query to identify a corresponding word cloud, based on the analysis, and accessing the corresponding word cloud in the database;
identifying a relevant audio segment from a plurality of audio segments stored in an inventory of audio segments, based on said analysis of the query;
analyzing the audio segment in respect to the plurality of terms included in the corresponding word cloud to identify at least one portion of the audio segment relevant to the query, each of the at least one portion is a subsegment; and
producing said at least one subsegment as an outputted audio file.

2. The method of claim 1, additionally comprising: providing the at least one subsegment in an audio form to the requestor.

3. The method of claim 1, wherein the plurality of word clouds are continuously updated, such that one or more existing terms are replaced with one or more new terms.

4. The method of claim 3, wherein the terms of each of the plurality of word clouds include one or more of: words, phrases, partial words or word segments, and combinations thereof.

5. The method of claim 1, wherein the relevant audio segment is identified by a computerized search engine.

6. The method of claim 1, wherein the audio segment is provided in text form.

7. The method of claim 1, wherein the at least one subsegment is of a length different than the length of the audio segment.

8. The method of claim 1, wherein the at least one subsegment is the same length as the audio segment.

9. The method of claim 1, wherein the at least one subsegment includes a plurality of subsegments arranged in a ranking based on relevancy to the query.

10. The method of claim 9, wherein the ranking is based on scores assigned to each subsegment of the plurality of subsegments.

11. The method of claim 1, wherein the analyzing the audio segment includes establishing boundaries within the audio segment for the at least one portion of the audio segment.

12. A system for providing audio content comprising:
at least one hardware processor;
a non-transitory storage device having stored thereon code instructions executable by said at least one hardware processor, said code instructions, when executed by said at least one hardware processor, cause said at least one hardware processor to:
generate and maintain a plurality of dynamically changing word clouds stored in a database, wherein each of said plurality of word clouds is associated with a different subject, said generating and maintaining is conducted by an execution process which reduces processing time, by:
monitoring a plurality of content sources,
analyzing a content of said plurality of content sources and identifying a plurality of content subjects,
for each content subject of said plurality of content subjects, extracting a list of terms identified in said plurality of content sources and associated with the respective content subject, and
storing, in said database, said content subject and the list of terms identified as associated with said content subject, as a word cloud of the plurality of word clouds;
wherein said code instructions, when executed by said at least one hardware processor, further cause said at least one hardware processor to:
receive a query from a requestor;
analyze a plurality of words included in said query to identify a corresponding word cloud, based on the analysis, and accessing the corresponding word cloud in the database;
identify a relevant audio segment from a plurality of audio segments stored in an inventory of audio segments, based on said analysis of the query;
analyze the audio segment in respect to the plurality of terms included in the corresponding word cloud to identify at least one portion of the audio segment relevant to the query, each of the at least one portion is a subsegment; and
produce said at least one subsegment as an outputted audio file.

13. The system of claim 12, wherein identifying said relevant audio segment is conducted using at least one computerized search engine.

14. The system of claim 12, wherein said code instructions, when executed by said at least one hardware processor, further cause said at least one hardware processor to provide the at least one subsegment in an audio form to the requestor.

15. The system of claim 12, wherein said code instructions, when executed by said at least one hardware processor, further cause said at least one hardware processor to continuously update the plurality of word clouds, such that one or more existing terms are replaced with one or more new terms.

16. The system of claim 15, wherein the terms of each of the plurality of word clouds include one or more of: words, phrases, partial words or word segments, and combinations thereof.

17. The system of claim 12, wherein the audio segment is in text form.

18. The system of claim 12, wherein said code instructions, when executed by said at least one hardware processor, further cause said at least one hardware processor to provide the at least one subsegment as at least two subsegments and to arrange the subsegments in accordance with a ranked order.

19. The system of claim 18, wherein the ranked order of the subsegments is based on scores assigned to each subsegment.

20. The system of claim 12, wherein the analyzing the audio segment includes establishing boundaries within the audio segment for the portion of the audio segment responsive to the query.

21. The computer program product of claim 20, wherein the at least one subsegment includes a plurality of subsegments arranged in a ranking based on relevancy to the query.

22. The computer program product of claim 21, wherein the ranking is based on scores assigned to each subsegment of the plurality of subsegments.

23. The computer program product of claim 20, wherein the analyzing the audio segment includes establishing boundaries within the audio segment for the at least one portion of the audio segment.

24. A computer program product comprising a computer readable non-transitory storage device having stored therein computer readable instructions for providing audio content, when executed by a computer, causing the computer to perform operations comprising:
- generating and maintaining a plurality of dynamically changing word clouds stored in a database, wherein each of said plurality of word clouds is associated with a different subject, said generating and maintaining is conducted by an execution process which reduces processing time, by:
  - monitoring a plurality of content sources,
  - analyzing a content of said plurality of content sources and identifying a plurality of content subjects,
  - for each content subject of said plurality of content subjects, extracting a list of terms identified in said plurality of content sources and associated with the respective content subject, and
  - storing, in said database, said content subject and the list of terms identified as associated with said content subject identified as associated with said content subject, as a word cloud of the plurality of word clouds;
- receiving a query over a network from a requestor;
- analyzing a plurality of words included in said query to identify a corresponding word cloud, based on the analysis, and accessing the corresponding word cloud in the database;
- identifying a relevant audio segment from a plurality of audio segments stored in an inventory of audio segments, based on said analysis of the query;
- analyzing the audio segment in respect to the plurality of terms included in the corresponding word cloud to identify at least one portion of the audio segment relevant to the query, each of the at least one portion is a subsegment; and
- producing said at least one subsegment as an outputted audio file.

25. The computer program product of claim 24, additionally comprising: providing the at least one subsegment in an audio form to the requestor.

26. The computer program product of claim 24, wherein the plurality of word clouds are continuously updated, such that one or more existing terms are replaced with one or more new terms.

27. The computer program product of claim 26, wherein the terms of each of the word clouds include one or more of: words, phrases, partial words or word segments, and combinations thereof.

28. The computer program product of claim 24, wherein the relevant audio segment is identified by a computerized search engine.

29. The computer program product of claim 24, wherein the audio segment is provided in text form.

30. The computer program product of claim 24, wherein the at least one subsegment is of a length different than the length of the audio segment.

31. The computer program product of claim 24, wherein the at least one subsegment is the same length as the audio segment.

* * * * *